United States Patent Office 3,475,347
Patented Oct. 28, 1969

3,475,347
CATALYSTS FOR THE POLYMERIZATION OF OLEFINS TO YIELD PREDOMINANTLY DIMERS AND TRIMERS
Burnett H. Johnson, Baytown, Tex., assignor to Esso Research and Engineering Company
No Drawing. Filed Nov. 16, 1966, Ser. No. 594,682
Int. Cl. B01j *11/00, 11/78*
U.S. Cl. 252—429       7 Claims

ABSTRACT OF THE DISCLOSURE

Lower olefins are polymerized to oligomers by a Friedel-Craft type catalyst system consisting of a first component selected from a compound having the formula:

$$RMeX_2 \text{ or } R_2MeX$$

where: R is a lower alkyl group, e.g., $C_1$ to $C_6$, X is Cl, Br, or I, and Me is Al, Ga or In; and the second component is according to the Mendeleev Periodic Table a Group I–B, II–B, or IV–B metal halide or binary compound of the metal halide with $AlCl_3$, $GaCl_3$, or $InCl_3$.

---

The present invention is directed to a catalyst of the Friedel-Craft type for the polymerization and copolymerization of olefins to produce low molecular weight compounds. More particularly, the invention is directed to a catalyst system consisting of two components which produces primarily dimers, trimers, and tetramers of olefins.

The present invention may be briefly described as a Freidel-Craft type catalyst system consisting of a first component selected from a compound having the formula:

$$RMeX_2 \text{ or } R_2MeX$$

where: R is a lower alkyl group, e.g., $C_1$ to $C_6$, X is Cl, Br, or I, and Me is Al( Ga or In; and the second component is according to the Mendeleev Periodic Table a Group I–B, II–B, or IV–B metal halide or binary compound of the metal halide with $AlCl_3$, $GaCl_3$, or $InCl_3$.

While the catalyst system of the present invention has been characterized as of the Friedel-Craft type, the catalyst system of the present invention has higher activities at moderate temperatures and pressures than known Friedel-Craft type catalysts. Further, the catalysts of the present invention are more selective to particular isomers, not necessarily the most stable thermodynamically, than is the case with most Friedel-Craft catalysts. One unusual property of the catalyst system of the present invention is the ability to produce straight chain dimers and trimers which involves reaction other than just the double bond.

The catalyst of the present invention will polymerize the lower olefins to the dimer, trimer, and tetramer. The lower olefins are illustrated by the $C_2$ to $C_6$ straight and branched chain monolefins such as ethylene, propylene, butene-1, cis and trans butene-2, isobutene, etc. Also mixtures of the lower olefins may be copolymerized.

The first component of the catalyst system of the present invention may be illustrated by methyl-aluminum dichloride, dimethyl aluminum chloride, ethyl-aluminum dibromide, dibutyl aluminum chloride, diethyl aluminum iodide, methylgallium dichloride, ethylindium dichloride, etc. Preferably the first component is an alkyl aluminum dichloride or dialkyl aluminum chloride; however, the monoalkyl aluminum dihalide is more reactive.

The second component of the catalyst system may be exemplified by CuX, $CuX_2$, AgX, $ZnX_2$, $CdX_2$, HgX, $HgX_2$, $SnX_4$, $SnX_2$, $PbX_2$, $CuMeX_4$, $AgMeX_4$, $ZnMe_2X_8$ and $PbMe_2X_8$ where X is Cl, Br or I and Me is Al, Ga or In. While each of the second component compounds of the catalyst system yields a straight chain dimer, the particular selection would be based on the specific isomers desired. For example in the dimerization of propylene, the catalyst system of the present invention yields with high activity trans-4-methyl-2-pentene in greater abundance than either 2-methyl-1-pentene or 2-methyl-2-pentene, both of which are more favored thermodynamically.

The components of the catalyst system of the present system may be combined and used in their pure state or preferably are dispersed in an inert saturated hydrocarbon diluent. Paraffin diluents such as hexane, heptane, octane, isooctane, cyclohexane and the like are suitable. The components are combined so that the mol ratio of the first component to the second component is equal to or greater than one. The mol ratio may be three to one; however, a ratio of one to one is suitable.

The dimerization reaction may be carried out at reaction temperatures of 0° C. to 150° C. The pressure of the reaction system in the dimerization of the normally gaseous olefins is between 0.1 to 100 atmospheres. However, room temperature and one atmosphere pressure are suitable. When normally liquid olefins are dimerized, the liquid olefin may be reacted in concentrations as low as 1%, although it is preferred to use higher concentrations, preferably 50% or higher.

The invention will be further illustrated by the following specific examples which are given by way of illustration and not as limitations on the scope of the invention.

EXAMPLE 1

A catalyst comprised of 0.1 gm. of $CuAlCl_4$ plus 0.1 gm. of $(C_2H_5)AlCl_2$ in 5 ml. of isooctane were introduced to flask with stirrer at 25° C. An atmosphere of propylene was added (760 mm. Hg pressure) and rapid reaction took place. Two grams of propylene was polymerized prior to stopping the reaction. The product was analyzed as shown below.

|  | Mol percent |
|---|---|
| 2-methylpentane | 1.3 |
| 4-methyl-1-pentene | 1.0 |
| Cis-4-methyl-2-pentene | 4.5 |
| Trans-4-methyl-2-pentene | 30.4 |
| 2-methyl-1-pentene | 0.6 |
| 2-methyl-2-pentene | 29.9 |
| Normal-hexenes | 27.4 |

EXAMPLE 2

The conditions were the same as Example 1, except $(C_2H_5)_2AlCl$ was used instead of $(C_2H_5)AlCl_2$. The product analyzed as follows:

|  | Mol percent |
|---|---|
| 4-methyl-1-pentene | 2.7 |
| Cis-4-methyl-2-pentene | 6.7 |
| Trans-4-methyl-2-pentene | 49.0 |
| 2-methyl-1-pentene | 2.7 |
| 2-methyl-2-pentene | 10.8 |
| Normal-hexenes | 28.1 |

EXAMPLE 3

The conditions were the same as Example 1, except CuCl was used instead of $CuAlCl_4$. The results are given below:

|  | Mol percent |
|---|---|
| 4-methyl-1-pentene | 1.5 |
| Cis-4-methyl-2-pentene | 5.7 |
| Trans-4-methyl-2-pentene | 33.5 |
| 2-methyl-1-pentene | 2.9 |
| 2-methyl-2-pentene | 24.1 |
| Normal-hexenes | 32.3 |

EXAMPLE 4

The conditions were the same as Example 1, except AgAlCl₄ was used instead of CuAlCl₄. The analysis of the product is given below:

| | Mol percent |
|---|---|
| 4-methyl-1-pentene | 1.4 |
| Cis-4-methyl-2-pentene | 5.7 |
| Trans-4-methyl-2-pentene | 39.8 |
| 2-methyl-1-pentene | 1.9 |
| 2-methyl-2-pentene | 29.2 |
| Normal-hexenes | 22.0 |

EXAMPLE 5

The conditions were the same as Example 1, except ZnAl₂Cl₈ was used instead of CuAlCl₄. The product analysis is given below:

| | Mol percent |
|---|---|
| 4-methyl-1-pentene | 1.9 |
| Cis-4-methyl-2-pentene | 11.2 |
| Trans-4-methyl-2-pentene | 60.8 |
| 2-methyl-1-pentene | 0.0 |
| 2-methyl-2-pentene | 0.0 |
| Normal-hexenes | 26.1 |

EXAMPLE 6

The conditions were the same as in Example 1, except PbAl₂Cl₈ was used instead of CuAlCl₄. The product distribution was as follows:

| | Mol percent |
|---|---|
| 4-methyl-1-pentene | 15.5 |
| Cis-4-methyl-2-pentene | 7.3 |
| Trans-4-methyl-2-pentene | 26.7 |
| 2-methyl-1-pentene | 2.5 |
| 2-methyl-2-pentene | 2.5 |
| Normal-hexenes | 45.5 |

EXAMPLE 7

A catalyst comprising 0.1 gm. of CuCl plus 0.12 gm. of $(C_2H_5)AlCl_2$ in 5 ml. of isooctane were introduced into a flask with stirrer at 25° C. An atmosphere of a 50–50 mol percent mixture of propylene and ethylene was added (760 mm. of Hg) and reaction took place. The product was analyzed and found to be approximately 29.6% $C_4$, 57.9% $C_5$, and 12.5% $C_6$ with small amounts of $C_8$. The $C_5$ fraction was predominately linear butenes.

By the foregoing example, the predominance of $C_5$ illustrates the copolymerization which will occur with mixtures of lower olefins.

EXAMPLE 8

A catalyst comprising 0.1 gm. of AgAlCl₄ plus 0.12 gm. of $(C_2H_5)AlCl_2$ in 5 ml. of isooctane were introduced into a flask at 25° C. and stirred. An atmosphere of ethylene was added and a rapid reaction occurred. The product was analyzed and found to be 77% $C_4$, 21% $C_6$, and 2% $C_8$.

The nature and objects of the present invention having been fully described and illustrated, what I wish to claim as new and useful and secure by Letters Patent is:

1. A catalyst consisting of:

a first component selected from a compound having the formula:

$$RMeX_2 \text{ and } R_2MeX$$

Where: R is a lower alkyl, Me is Al, Ga or In and X is Cl, Br, or I; and a second component selected from the binary compounds of a member of the group consisting of group I–B, II–B, and IV–B metal halides with a member of the group consisting of AlCl₃, GaCl₃, and InCl₃, said first component and second component being combined such that the mole ratio is between 1:1 and 3:1.

2. A catalyst of claim 1 wherein Me is Al and X is Cl in said first component.

3. A catalyst of claim 1 wherein said second component is CuAlCl₄.

4. A catalyst of claim 1 wherein said second component is AgAlCl₄.

5. A catalyst of claim 1 wherein said second component is ZnAl₂Cl₈.

6. A catalyst of claim 1 wherein said second component is PbAl₂Cl₈.

7. A catalyst of claim 2 wherein said second component is selected from the group consisting of CuAlCl₄, AgAlCl₄, ZnAl₂Cl₈, and PbAl₂Cl₈.

References Cited

UNITED STATES PATENTS

| | | | |
|---|---|---|---|
| 2,993,035 | 7/1961 | Christman | 260—94.3 |
| 3,128,252 | 4/1964 | Tornqvist | 252—429 |
| 3,121,063 | 2/1964 | Tornqvist | 252—429 |
| 3,001,951 | 8/1961 | Tornqvist | 252—429 |
| 2,914,520 | 11/1959 | Vandenburg | 260—94.9 |

FOREIGN PATENTS

| | | |
|---|---|---|
| 617,652 | 4/1961 | Canada. |

PATRICK P. GARVIN, Primary Examiner

PHILIP M. FRENCH, Assistant Examiner

U.S. Cl. X.R.

260—683.15